(12) United States Patent
Fowler et al.

(10) Patent No.: US 9,200,596 B2
(45) Date of Patent: Dec. 1, 2015

(54) CATALYTICALLY ENHANCED GAS GENERATOR SYSTEM FOR ROCKET APPLICATIONS

(75) Inventors: Robert B. Fowler, Jupiter, FL (US); Claude R. Joyner, North Palm Beach, FL (US)

(73) Assignee: AEROJET ROCKETDYNE, INC., Rancho Cordova, CA (US)

( * ) Notice: Subject to any disclaimer, the term of this patent is extended or adjusted under 35 U.S.C. 154(b) by 973 days.

(21) Appl. No.: 13/325,007

(22) Filed: Dec. 13, 2011

(65) Prior Publication Data

US 2013/0145742 A1    Jun. 13, 2013

(51) Int. Cl.
*F02K 9/64* (2006.01)
*F02K 9/48* (2006.01)
*F02K 9/68* (2006.01)

(52) U.S. Cl.
CPC ... *F02K 9/64* (2013.01); *F02K 9/48* (2013.01); *F02K 9/68* (2013.01)

(58) Field of Classification Search
CPC ............. F02K 9/44; F02K 9/46; F02K 9/48; F02K 9/50; F02K 9/64; F02K 9/68
See application file for complete search history.

(56) References Cited

U.S. PATENT DOCUMENTS

| | | |
|---|---|---|
| 3,541,788 A | 11/1970 | Schutz |
| 3,662,960 A | 5/1972 | Mitchell et al. |
| 4,100,733 A | 7/1978 | Striebel et al. |
| 5,054,287 A | 10/1991 | Schneider |
| 5,151,171 A | 9/1992 | Spadaccini et al. |
| 5,165,224 A | 11/1992 | Spadaccini et al. |
| 5,176,814 A | 1/1993 | Spadaccini et al. |
| 5,207,053 A | 5/1993 | Spadaccini et al. |
| 5,232,672 A | 8/1993 | Spadaccini et al. |
| 5,392,595 A | 2/1995 | Glickstein et al. |
| 5,414,992 A | 5/1995 | Glickstein |
| 6,470,670 B2 | 10/2002 | Maeding |
| 6,832,471 B2 | 12/2004 | Hewitt |
| 7,389,636 B2 | 6/2008 | Fowler et al. |
| 7,685,807 B2 | 3/2010 | Watkins et al. |
| 7,690,192 B2 | 4/2010 | Pederson et al. |
| 2004/0107692 A1 | 6/2004 | Horn et al. |

*Primary Examiner* — Andrew Nguyen
(74) *Attorney, Agent, or Firm* — Joel G Landau

(57) ABSTRACT

A rocket engine system with a fuel conversion system in communication with a gas generator.

1 Claim, 2 Drawing Sheets

CATALYTICALLY ENHANCED GAS GENERATOR SYSTEM FOR ROCKET APPLICATIONS

BACKGROUND

The present disclosure relates to rocket engines, and more particularly to a gas generator system therefor.

Rocket engines utilize different types of rocket propellants. Liquid propellants are desirable as they generally provide a higher specific impulse than solid propellants. Among liquid propellants, hydrogen-oxygen propellants represent a benchmark for desirable specific impulse. However, there may be some operational drawbacks as liquid hydrogen is demanding in terms of storage, delivery, etc.

Kerosene is a suitable alternative to hydrogen as a rocket propellant, however, kerosene may be vulnerable to combustion efficiency and stability issues. Combustion efficiency generally refers to the completeness of the burning of propellants during engine operation. In kerosene-oxygen rocket engines, some kerosene may exit without being burned, which lowers combustion efficiency and engine thrust. Combustion stability may also be an issue with kerosene rocket propellants, in that oscillations in pressure may be produced.

Combustion instability is typically defined as combustion resultant pressures that vary more than +/−10% of the mean pressure which may occur from the hydraulic effects of the incoming propellants or from non-steady heat release from the combustion process. Combustion Instability may occur in any propellant class, however, the propellant combination that suffers the most is hydrocarbon (HC) fuels and liquid oxygen (Lox) oxidizer. The large HC molecule must be vaporized and then split into its constituents to combust. It is this process and its effect that may lead to combustion instability. Therefore fuel propellants that are often used in the industry such as RP-1 (C12H24) may be particularly problematic.

SUMMARY

A rocket engine system according to an exemplary aspect of the present disclosure includes a fuel conversion system in communication with a gas generator.

A rocket engine system according to an exemplary aspect of the present disclosure includes a fuel conversion system in communication with a cooling jacket to receive a liquid rocket propellant therefrom, and in communication with a turbopump to receive an exhaust therefrom.

A method of powering a rocket engine system according to an exemplary aspect of the present disclosure includes converting a rocket propellant fuel to a supercritical state in a fuel conversion system to generate a converted fuel; and communicating the converted fuel to a gas generator.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
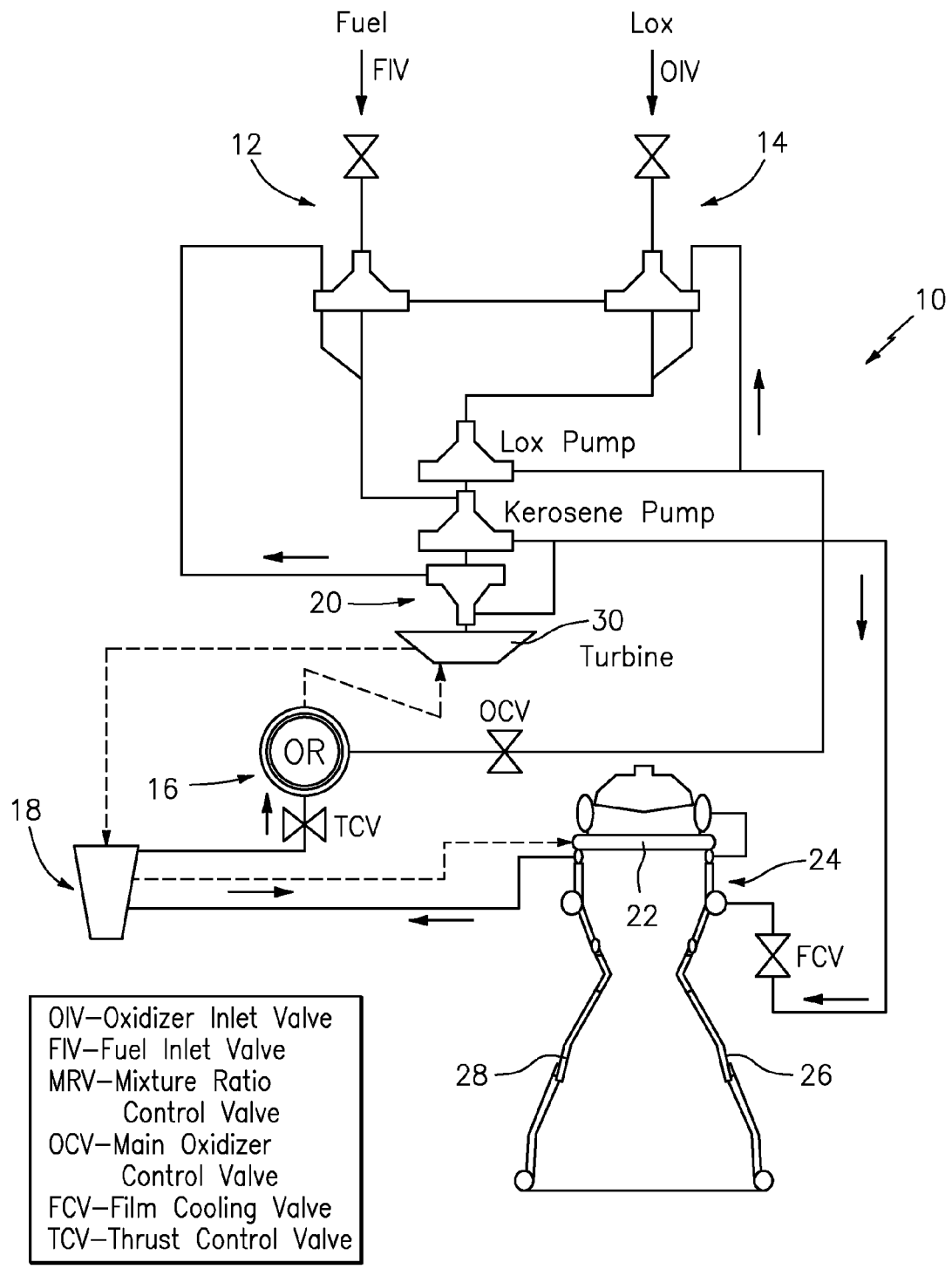
FIG. 1 is a schematic view of a Closed Staged Combustion (CSC) cycle rocket engine system with a fuel conversion system according to one non-limiting embodiment of the present invention.

FIG. 1 schematically illustrates a rocket engine system 10. The rocket engine system 10 generally includes a fuel supply system 12, an oxidizer supply system 14, a gas generator system 16, a fuel conversion system 18 and a turbopump 20 to communicate propellants to an injector section 22 of a combustion chamber 24. The combustion chamber 24 receives the rocket propellants such as a kerosene-type hydrocarbon fuel and an oxidizer such as a gaseous oxygen (GO2) to be combusted then expelled as combusted gases through a nozzle 26 to generate thrust. The nozzle 26 and the combustion chamber 24 generally defines a thrust chamber assembly. It should be understood that although the thrust chamber in the illustrated embodiment is a rocket engine, other rocket engine types, airbreathing engines, hypersonics and power generators will also benefit herefrom.

The fuel supply system 12 delivers the rocket propellant in liquid form to the injector section 22 via the turbo pump 20. The rocket propellant may be communicated through a nozzle cooling jacket 28 prior to communication to the injector section 22. The cooling jacket 28 includes a multiple of channels through which the rocket propellant flows to cool the nozzle 26. The cooling jacket 28 may surround the nozzle 26, the combustion chamber 24 or any portion or combination of the thrust chamber assembly.

A relatively small percentage such as 10% of the rocket propellant is communicated to the gas generator system 16 via the upstream fuel conversion system 18. The fuel conversion system 18 is essentially a heat exchanger hydrocarbon "cracker" which converts or "cracks" the kerosene-type fuel through an endothermic process to produce a converted fuel that is in a supercritical and/or endothermically converted state. The fuel conversion system 18 may utilize various endothermic conversion processes such as a catalyst and heat.

"Converted" fuel is in a supercritical and/or endothermically converted state. Kerosene-type fuels reach a supercritical state at conditions above approximately 350 psi (2,413 kPa) in pressure and approximately 800.degree. F (427 degree C.) in temperature, where physical properties of the fuel change such that the liquid meniscus disappears and the fuel behaves much like a gas. At temperatures above approximately 1,000.degree. F (538.degree. C), kerosene-type fuels undergo chemical changes into simpler, lighter molecular weight hydrocarbons.

Depending in part upon the specific conditions of the particular application, such as the amount of heat available from the turbopump 20 to convert the fuel, the particular characteristics of the conversion process may vary. For instance, the fuel conversion system 18 will convert some of the fuel to a supercritical state and the rest may be endothermically converted. The particular percentage of fuel converted to the supercritical state versus an endothermically converted state may also vary for different applications. However, in all cases, substantially all the converted fuel generally performs like a gas which facilitates stable operation of the gas generator system 16. That is, the use of fuel in a supercritical and/or endothermically converted state promotes combustion efficiency and combustion stability within the gas generator system 16 which may be the most instability prone system.

The oxidizer supply system 14 delivers the oxidizer through the turbopump 20 to the gas generator system 16 which in this disclosed non-limiting embodiment may be a conventional preburner for use in a turbine 30 of the turbopump 20 and thence in the main combustion process.

The converted fuel is communicated to the gas generator system 16 and burned with oxidizer from the oxidizer supply system 14 which is also delivered by the turbopump 20. The exhaust from the gas generator system 16 is utilized to drive the turbine 30 of the turbopump 20, communicated to the fuel conversion system 18 then to the injector section 22. Typically, the exhaust flow is very fuel or oxidizer rich and is at a significantly higher pressure than the combustion chamber.

That is, all of the required oxidizer flow is brought through the gas generator system 16 and heated to a gas by the combustion of a small percentage of the rocket propellant. This is similar to the RD-170 family of engines operation, however, here the rocket propellant is first cracked by the fuel conversion system 18 and heat from turbine 30 exhaust flow. This facilitates a reduction in combustion instabilities in the gas generator system 16 which has been known to affect high pressure preburners that burn liquid propellants. The cracking of the fuel in the separate fuel conversion system 18 thereby facilitates stability.

Figure 2:
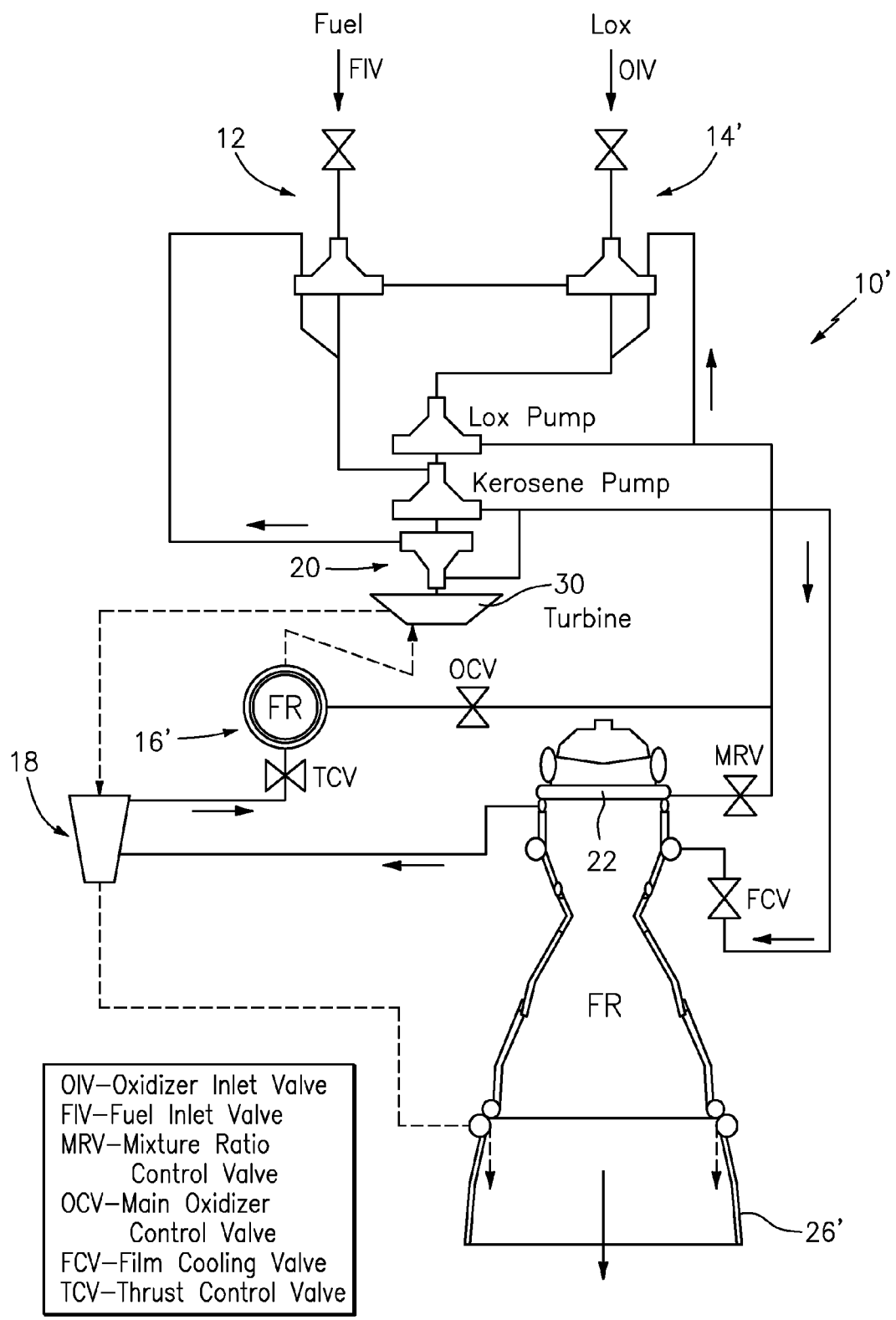
FIG. 2 is a schematic view of an Open Gas Generator (OGG) rocket engine system with a fuel conversion system according to one non-limiting embodiment of the present invention.

With reference to FIG. 2, another rocket engine system 10' utilizes an Open Gas Generator (OGG) but is otherwise as discussed above. The OGG cycle mixes a small percentage of the fuel and oxidizer propellants in the Gas Generator system 16', which then routes the exhaust flow to a turbine 30 that utilizes this energetic mass flow of combustion gases to provide the energy required to raise the propellant pressures to a sufficient level for main chamber combustion and thrust. Downstream of the turbine 30, this flow is then either ducted to the atmosphere or flowed to a low pressure portion of the nozzle 26' for exhausting as exhaust film coolant.

This cycle however still uses liquid propellant combustion so it will benefit from the cracked fuel. It should be appreciated that the rocket engine system 10' operates at a generally lower specific impulse than staged combustion cycles.

With the best mode for carrying out the invention and the operation thereof having been described, certain additional features and benefits of the invention can now be more readily appreciated. For example, the disclosed rocket engine systems will reduce risk to the preburner or gas generator operations which are otherwise the most instability prone systems.

It should be noted that the operation of the fuel conversion system 18 of the overall engine system is described with respect to endothermic conversion during steady-state engine operation after the startup transient is complete. The provision of heat for fuel conversion during the startup transient may require other design considerations, such as an auxiliary heat source.

It should be understood that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of powering a rocket engine system comprising:
    converting a rocket propellant fuel to a supercritical state in a fuel conversion system to generate a converted fuel;
    communicating the converted fuel to a gas generator;
    communicating an oxidizer from an oxidizer supply system of the rocket engine system to the gas generator, burning the converted fuel in the gas generator, thereby creating an oxidizer rich exhaust;
    communicating the oxidizer rich exhaust from the gas generator to a turbine of a turbopump; and
    communicating the oxidizer rich exhaust from the turbopump to the fuel conversion system to an injector of a combustion chamber.

\* \* \* \* \*